United States Patent
Persson et al.

(10) Patent No.: US 8,700,409 B1
(45) Date of Patent: Apr. 15, 2014

(54) REAL-TIME VERSIONING OF DEVICE-BOUND CONTENT

(75) Inventors: Carl J. Persson, Olathe, KS (US); Jeremy Richard Breau, Kansas City, MO (US); Eric Eugene Miller, Olathe, KS (US); Sei Yen Ng, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 757 days.

(21) Appl. No.: 12/917,187

(22) Filed: Nov. 1, 2010

(51) Int. Cl.
*G10L 15/22* (2006.01)
*H04N 5/445* (2011.01)

(52) U.S. Cl.
USPC ............. 704/278; 704/270; 725/25; 725/28

(58) Field of Classification Search
USPC .................. 704/275, 270, 278; 725/25, 28
See application file for complete search history.

(56) References Cited

U.S. PATENT DOCUMENTS

| | | | |
|---|---|---|---|
| 6,317,795 B1 | 11/2001 | Malkin et al. | |
| 8,005,913 B1* | 8/2011 | Carlander | 709/207 |
| 2001/0042107 A1 | 11/2001 | Palm | |
| 2002/0111818 A1* | 8/2002 | Morar et al. | 705/1 |
| 2003/0126267 A1* | 7/2003 | Gutta et al. | 709/229 |
| 2003/0135493 A1* | 7/2003 | Phelan et al. | 707/3 |
| 2003/0192044 A1* | 10/2003 | Huntsman | 725/25 |
| 2004/0006767 A1* | 1/2004 | Robson et al. | 725/28 |
| 2005/0022229 A1* | 1/2005 | Gabriel et al. | 725/28 |
| 2005/0111441 A1* | 5/2005 | Koskelainen | 370/352 |
| 2005/0268317 A1* | 12/2005 | Cormack et al. | 725/25 |
| 2006/0004716 A1* | 1/2006 | Hurst-Hiller et al. | 707/3 |
| 2006/0048184 A1* | 3/2006 | Poslinski et al. | 725/45 |
| 2006/0075015 A1* | 4/2006 | Wu et al. | 709/202 |
| 2006/0107823 A1 | 5/2006 | Platt et al. | |
| 2006/0123338 A1* | 6/2006 | McCaffrey et al. | 715/531 |
| 2006/0130119 A1* | 6/2006 | Candelore et al. | 725/135 |
| 2006/0259543 A1* | 11/2006 | Tindall | 709/203 |
| 2008/0031233 A1* | 2/2008 | Ito et al. | 370/355 |
| 2008/0090513 A1* | 4/2008 | Collins et al. | 455/3.01 |
| 2008/0134282 A1* | 6/2008 | Fridman et al. | 726/1 |
| 2008/0184284 A1* | 7/2008 | O'Hern | 725/28 |
| 2008/0250484 A1* | 10/2008 | Chong et al. | 726/7 |
| 2009/0005076 A1* | 1/2009 | Forstall et al. | 455/456.2 |
| 2009/0082033 A1 | 3/2009 | Sasaki et al. | |
| 2009/0089828 A1* | 4/2009 | Carlsgaard et al. | 725/28 |
| 2009/0328093 A1* | 12/2009 | Cansler et al. | 725/28 |
| 2010/0043040 A1 | 2/2010 | Olsen, Jr. | |
| 2010/0169459 A1 | 7/2010 | Biderman et al. | |
| 2010/0178030 A1 | 7/2010 | Colby | |
| 2010/0280828 A1* | 11/2010 | Fein et al. | 704/246 |
| 2011/0113332 A1* | 5/2011 | Roberts et al. | 715/716 |
| 2011/0302308 A1* | 12/2011 | Prodan et al. | 709/225 |

OTHER PUBLICATIONS

PreInterview First Action Interview in U.S. Appl. No. 12/942,722, Mailed Sep. 6, 2012.
Final Office Action, in U.S. Appl. No. 12/942,722, mail date: Jun. 5, 2013, 55 pages.

* cited by examiner

Primary Examiner — Jialong He

(57) ABSTRACT

Subject matter described herein relates to providing to a mobile device a version of content (e.g., music, video, text message, live call, etc.) that is consistent with a user's filter setting. That is, a user is allowed to specify content elements (e.g., words or images) that are proscribed from being presented on the mobile device, and the user's preferences are stored by a mobile telecommunications network. When the network receives content to be provided to the mobile device, the network edits the content in real time to prevent proscribed elements from being presented on the mobile device.

17 Claims, 4 Drawing Sheets

REAL-TIME VERSIONING OF DEVICE-BOUND CONTENT

SUMMARY

Embodiments of the invention are defined by the claims below, not this summary. A high-level overview of various aspects of the invention are provided here for that reason, to provide an overview of the disclosure and to introduce a selection of concepts that are further described below in the detailed-description section. This summary is not intended to identify key features or essential features of the claimed subject matter, nor is it intended to be used as an aid in isolation to determine the scope of the claimed subject matter.

An embodiment of the present invention is directed to providing to a mobile device a content-item version that is consistent with a user setting. That is, a user is allowed to specify content elements (e.g., words or images) that are proscribed from being presented on the mobile device, and the user's preferences are stored by a mobile telecommunications network. When the network receives a content item to be provided to the mobile device, the network edits the content in real time to prevent proscribed elements from being presented on the mobile device.

BRIEF DESCRIPTION OF THE DRAWINGS

Illustrative embodiments of the present invention are described in detail below with reference to the attached drawings, wherein.

DETAILED DESCRIPTION

The subject matter of embodiments of the present invention is described with specificity herein to meet statutory requirements. But the description itself is not intended to necessarily limit the scope of claims. Rather, the claimed subject matter might be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly stated.

Embodiments of the present invention might be embodied as, among other things: a method, system, or set of instructions embodied on one or more computer-readable media. Computer-readable media include both volatile and nonvolatile media, removable and nonremovable media, and contemplate media readable by a database, a switch, and various other network devices. By way of example, and not limitation, computer-readable media include media implemented in any method or technology for storing information readable by a computing device. Examples of stored information include program modules including instructions, data structures, other data representations, and the like. Media examples include, but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Figure 1:
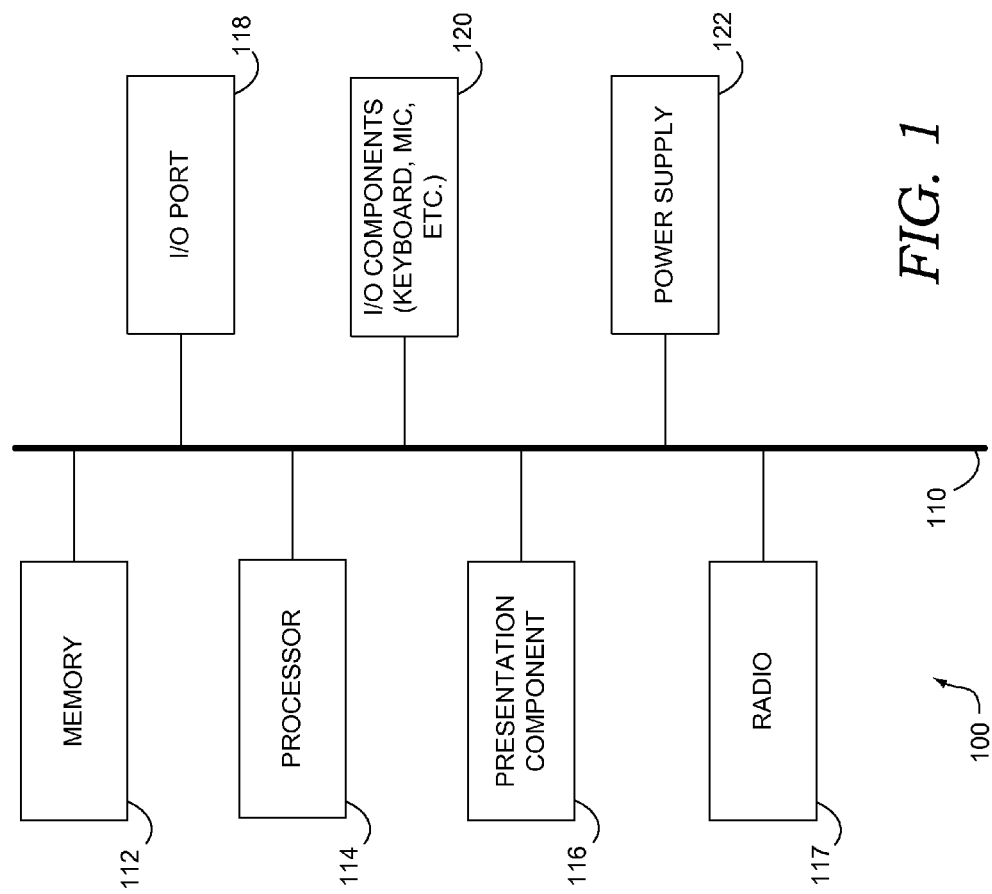
FIG. 1 depicts an exemplary device in accordance with an embodiment of the present invention.

Turning now to FIG. 1, a block diagram of an illustrative mobile computing device ("mobile device") is provided and referenced generally by the numeral 100. Although some components are shown in the singular, they may be plural. For example, mobile device 100 might include multiple processors or multiple radios, etc. As illustratively shown, mobile device 100 includes a bus 110 that directly or indirectly couples various components together including memory 112, a processor 114, a presentation component 116, a radio 117, input/output ports 118, input/output components 120, and a power supply 122.

Memory 112 might take the form of one or more of the aforementioned media. Thus, we will not elaborate more here, only to say that memory component 112 can include any type of medium that is capable of storing information in a manner readable by a computing device. Processor 114 might actually be multiple processors that receive instructions and process them accordingly. Presentation component 116 includes the likes of a display, a speaker, as well as other components that can present information (such as a lamp (LED), or even lighted keyboards).

Radio 117 represents a radio that facilitates communication with a wireless telecommunications network. Illustrative wireless telecommunications technologies include CDMA, GPRS, TDMA, GSM, WIMAX, LTE and the like. In some embodiments, radio 117 might also facilitate other types of wireless communications including Wi-Fi communications and GIS communications.

Input/output port 118 might take on a variety of forms. Illustrative input/output ports include a USB jack, stereo jack, infrared port, proprietary communications ports, and the like. Input/output components 120 include items such as keyboards, microphones, touch screens, and any other item usable to directly or indirectly input data into mobile device 110. Power supply 122 includes items such as batteries, fuel cells, or any other component that can act as a power source to power mobile device 110.

Figure 2:
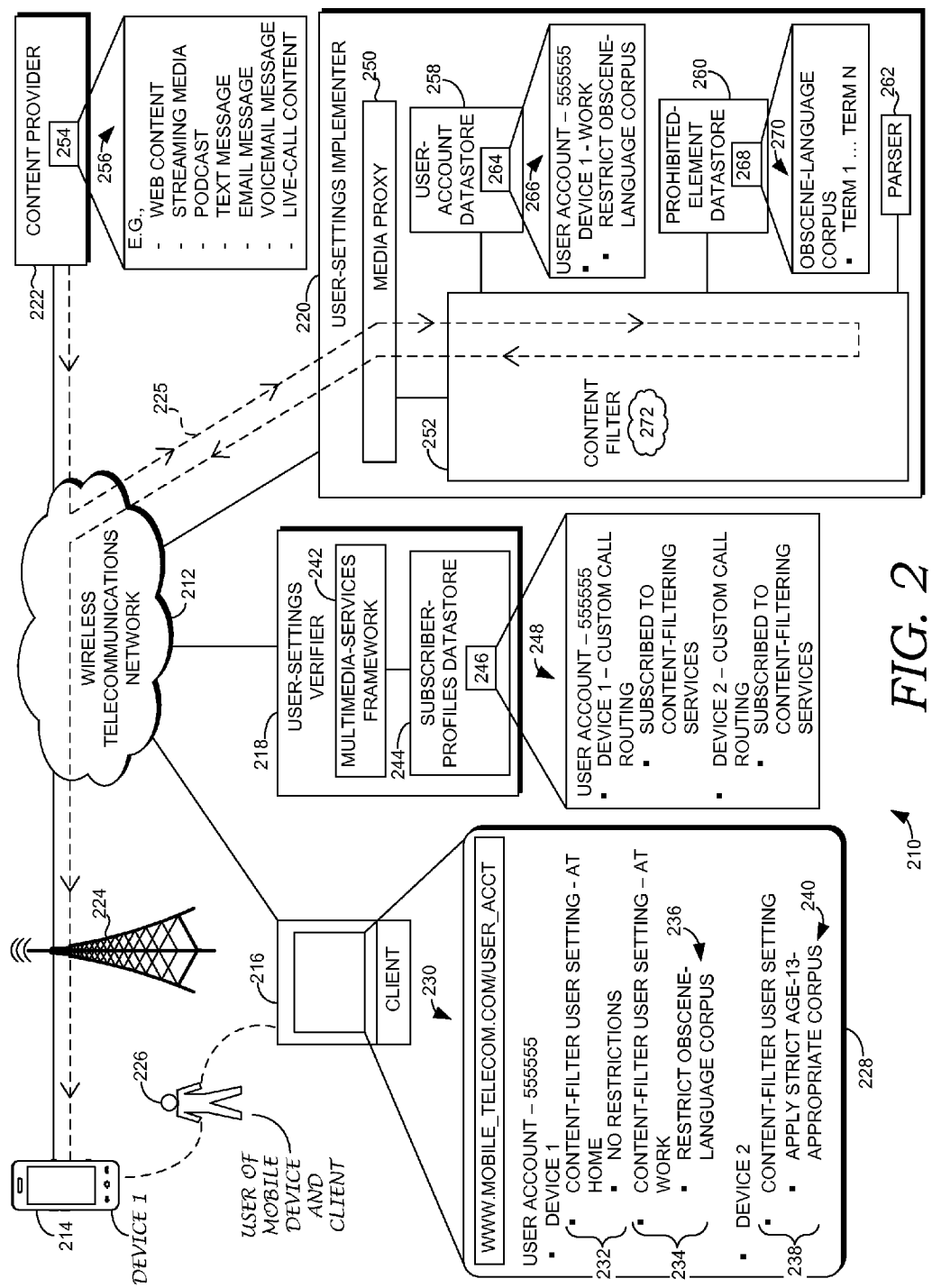
FIG. 2 depicts an exemplary operating environment in accordance with an embodiment of the present invention.

Referring now to FIG. 2, an exemplary operating environment is depicted and is generally identified by reference numeral 210. Environment 210 includes various components that communicate by way of wireless communications network 212. For example, environment 210 includes a mobile device 214, a client computing device 216, user-settings verifier 218, a user-settings implementer 220, and a content provider 222. Each of these components communicates with one another via network 212 and will be described in more detail hereinafter.

Communication between components 214, 216, 218, 220, and 222 might occur under various circumstances. For example, mobile device 214 might communicate with network 212 via base station 224 (also referred to as "tower"), such as when mobile device 214 initiates a phone call, sends a text message, or requests content (e.g., media) from content provider 222. Further, a request from mobile device 214 to receive content from content provider 222 might be routed through user-settings verifier 218 before being forwarded to content provider 222. In another example, information entered via client computing device 216 might be communicated to user-settings verifier 218 via network 212. In a further example, content supplied by content provider 222 might be routed through user-settings implementer 220 before being transmitted to mobile device 214. These are merely examples of communication between components of environment 210 that will be described in more detail hereinafter.

Each of components 214, 216, 218, 220, and 222 will now be described in more detail. In one embodiment, mobile device 214 includes those elements described with respect to FIG. 1 and could be a cell phone, smart phone, PDA, or any of a variety of other types of handheld devices. Mobile device 214 communicates with network 212 via tower 224 using various technologies, such as those described with respect to FIG. 1. Mobile device 214 might communicate with network 212 in various circumstances, such as when mobile device initiates or receives a phone call, initiates or receives a text message, retrieves a voicemail message, uses location-based services of network 212, or requests or receives content (e.g., audio or video) from a content provider (e.g., website).

Content provider 222 sends to network 212 content that is to be provided to mobile device 214. For example, content provider 222 might include a web server or another mobile device. Content provider 222 might be a component of, and controlled by network 212. Alternatively, content provider might be an independent third party. Content provider 222 includes information 254 that, for illustrative purposes, is depicted in exploded view 256. Exploded view 256 lists exemplary types of content that might be sent by content provider 222 to be provided to mobile device 214. Exemplary content includes web content, streaming media (e.g., YouTube® video), podcast, text message, email message, voicemail message, and live-call content. In an embodiment, content is communicated from content provider 222 to mobile device 214 along a content path 225, which might also be referred to as a media path.

Client computing device 216 includes any computing device (e.g., desktop, laptop, notebook, netbook, tablet, handheld, PDA, and mobile device) that is connectable to network 212 (such as via the Internet) and that allows access to information provided by network 212. For example, network 212 might make available, such as via a web page, user-account information that relates to an account of device 214. As such, computing device 216 allows access to that account information. Environment 210 depicts a user 226 that uses both device 214 and client 216. For example, using client 216 the user might logon to a website of network 212 to view and modify account information (e.g., registered devices and network-usage-plan parameters) related to mobile device 214.

In an embodiment of the present invention, network 212 provides a web-based registration service with which user 226 can interact using client 216. The web-based registration service allows user 226 to logon to his or her account and modify account settings. For example, user 226 might want to customize content that is provided to devices (e.g., 214) registered under an account of the user. That is, as will be described in more detail hereinafter, components of network 212 filter content (e.g., content from content provider) that is provided to mobile device 214, such as by preventing a presentation of prohibited elements (e.g., explicit language). As such, via the web-based registration service, user 226 can subscribe to, and control settings of, the content-filtering service.

Client 216 includes screenshot 228, which is depicted in an exploded view 230. Screenshot depicts account information that describes two devices (e.g., "Device 1" and "Device 2") registered under the account (e.g., "User Account—555555"). FIG. 2 depicts that "Device 1" refers to mobile device 214. Screenshot 228 depicts that for device 1, multiple content-filter user settings 232 and 234 have been customized and the applicability of each user setting 232 and 234 depends on a location of device 1. For example, a first setting 232 is to be applied when device 214 is located "at home," whereas a second user setting 234 is to be applied when device 214 is located "at work." "At home" and "at work" are just examples of locations, and user filter settings could be established for any location using any type of geographical identifier (e.g., geographical coordinates, city, state, zip code, street, business, etc.). Although location-based filters are possible, in another embodiment, a filter might be applied regardless of where a device is located. For example, user setting 238 might be applied at all times to Device 2. Such a filter might be desirable for a parent wanting to set controls on a device used by a child.

Screenshot 228 also depicts content filters that have been selected or customized for Device 1 and Device 2. For example, setting 234 includes a filter identifier 236, which indicates that obscene language will be edited from content provided to Device 2, when Device 2 is located at work. Also, setting 238 includes filter identifier 240, which indicates that content provided to Device 2 should be age-13 appropriate.

In addition to setting identifiers 236 and 240, a variety of other types of filters might be selected by a user. For example, a user might create his or her only dictionary of words that are not allowed to be presented on a particular mobile device. Moreover, a user might select a certain rating from a rating system (e.g., motion picture rating system), such as "adults only," "high school and above," and "appropriate for anyone." Likewise, certain themed filters might be selectable, such as a "Disney-theme filter" in which inappropriate language is replaced with language commonly used in Disney® media (e.g., movies). Another filter might include a source-specific filter that only filters content from a specified content provider (e.g., specified website or specified mobile device). These are merely examples of filter types, and a user might create or apply a variety of other filter types, thereby allowing a high level of customization to meet the filter needs of a user.

In a further embodiment, a subscription by a user to a service (e.g., content-filtering service) provided by network 212 is memorialized in user-settings verifier 218. User-settings verifier 218 includes a multimedia-services framework 242 and a subscriber-profiles datastore 244. Multimedia-service framework 242 is an architectural framework that is used to provide mobile device 214 with multimedia content via the Internet. An example of framework 242 includes an "Internet Protocol Multimedia Services (IMS) Core."

Subscriber-profiles datastore 244 includes a user database that supports framework 242 and that contains subscription-related information used to authenticate and authorize a user. An example of a subscriber-profiles datastore includes a Home Subscriber Server (HSS). Datastore 244 includes information 246 that, for illustrative purposes, is depicted in exploded view 248. Exploded view 248 depicts information related to "User Account—555555" (i.e., same user account as depicted in screenshot 228) and indicates that both Device 1 and Device 2 are subscribed to content-filtering services. Exploded view 248 also indicates that Device 1 and Device 2 require custom call routing.

Environment 210 also includes user-settings implementer 220, which includes components that enable network 212 to execute various services, such as content filtering. For example, user-settings implementer 220 includes a media proxy 250 in communication with a content filter 252.

In an embodiment of the invention, media proxy 250 is inserted into the content path 225 or media path that communicates content from content provider 222 to mobile device 214. For example, multimedia-services framework 242 might insert media proxy 250 into the content path after verifying that mobile device 214 has subscribed to content-filtering services. Media proxy 250 might be inserted by exchanging media-proxy RTP ports with the mobile device and the content provider. Media proxy 250 routes content that is to be provided to mobile device 214 to content filter 252.

Content filter 252 communicates with a user-account datastore 258, a prohibited-element datastore 260, and a parser 262. User-account datastore 258 maintains content-filter settings related to user accounts. For example, user-account datastore 258 includes information 264 that for illustrative purposes is depicted in an exploded view 266. Exploded view 266 indicates that content-filter settings related to "User Account—555555" (i.e., same user account as described with respect to screenshot 228 and subscriber-profiles datastore 244) are stored in user-account datastore 258. That is, a user setting in information 264 indicates that when Device 1 of User Account 555555 is at work, content filter 252 should modify content to prevent items included in an obscene-language corpus from being presented on mobile device 214. Accordingly, by referencing user-account datastore 258, content filter 252 can determine what settings are established for a particular mobile device.

Prohibited-element datastore 260 maintains a listing of all prohibited elements, which might be organized under filter-setting identifiers. A prohibited element includes any part (e.g., audible speech, text, and images) of content that might be proscribed from being presented on a mobile device. For example, when a user selects a "restrict obscene-language corpus" the user might proscribe all audible speech included in the corpus from being presented on a mobile device.

As previously indicated, various types of filter-setting identifiers might be used. For example, network 212 (or some other third party) might compile various corpuses of words that are listed under respective identifiers. Moreover, a user might define the user's own identifier and corresponding corpus of elements. Prohibited-element datastore 260 includes information 268 that for illustrative purposes is depicted in exploded view 270. Exploded view 270 illustrates that information 268 might include a filter-setting identifier, such as "obscene-language corpus," and that a list of terms (i.e., term 1 through term n) are organized under the filter-setting identifier. Once content filter 252 has determined a user setting, such as by referencing user-account datastore 258, content filter 252 can query prohibited-element datastore 260 to determine what elements should be filtered based on the user setting.

Parser 262 functions to analyze an item of content to determine if the item includes any prohibited elements, which were retrieved from prohibited-element datastore 260. For example, if an item includes a set of text, parser 262 parses the set to determine if any prohibited elements are included. In another example, if an item includes an audible-speech portion, the audible-speech portion is converted to a set of text, which is then parsed by the parser 262.

Once parser 262 determines that an item of content includes a prohibited element, the item can be modified to prevent a presentation of the prohibited element. For example, either content filter 252 or media proxy 250 might execute editing functionality. An item might be modified in various manners, such as by deleting the prohibited element from the content item, inserting a blocking censor (e.g., audible beep) that masks the presentation, or replacing the prohibited element with an acceptable term. These are merely examples of censoring techniques, and any other suitable censoring techniques might also be applied.

Illustrative operating environment 210, which is described above, is usable to provide to mobile device 214 a content-item version that is consistent with a user setting (e.g., 236). Absent our technology, various content versions might be created by a content creator; however, these content versions are not customized to match a user's personalized settings (e.g., user-defined corpus of prohibited terms). Moreover, certain types of content might not be well suited to include multiple versions (e.g., text messages, email messages, live-call content, voicemail messages, and user-created posted content (e.g., YouTube® content)). Furthermore, a content creator might not be willing to absorb cost associated with creating multiple versions of a content item.

Accordingly, an embodiment of the present invention provides to a mobile device a content-item version that is consistent with a user setting without requiring a content creator to create multiple versions. That is, components of environment 210 work together to edit a content item in real time to be consistent with a user setting. For example, content filter 252 includes application 272, which carriers out various functions that will be described in more detail hereinafter. Other components of environment 210 might likewise include computer-executable instructions that carry out certain functions. As such, an embodiment of the present invention allows filter settings to be highly customized to match censoring wants and needs of a user. Moreover, techniques described herein provide a more trusted approach, since editing is performed by the network as opposed to on the device. In addition, a user can subscribe to a variety of different settings to be applied to various devices registered under a single account.

Figure 3:
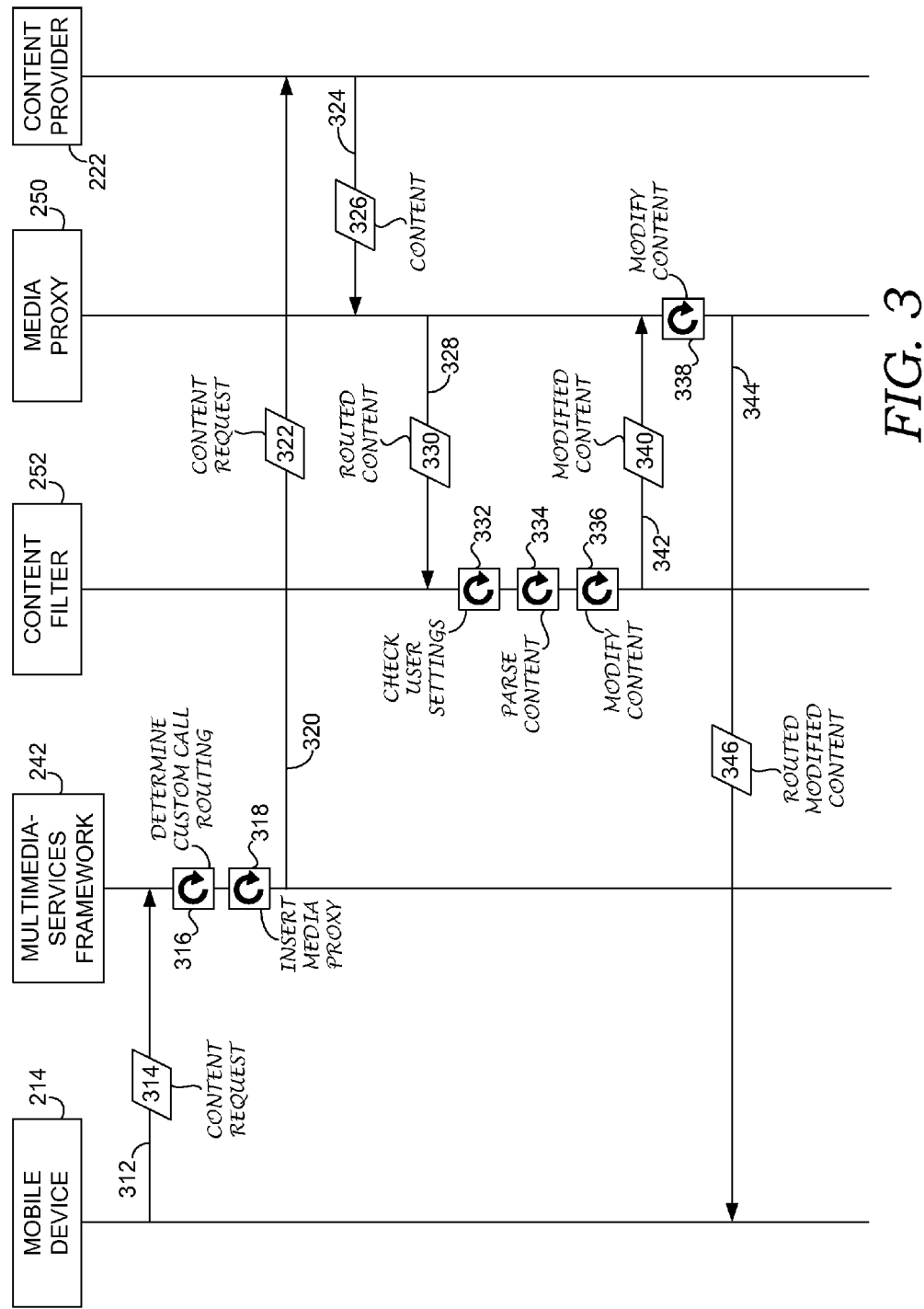
FIGS. 3-4 depict a respective flow diagram in accordance with an embodiment of the present invention.

Now referenced is FIG. 3, which depicts exemplary steps that are carried out when providing to a mobile device a content-item version that is consistent with a user setting. When describing FIG. 3, reference might be made to FIG. 2. At step 312, mobile device 214 communicates a request 314 to receive content. Request 314 might include various categories of information, such as a destination (e.g., destination mobile device or content provider), as well as, a location of the mobile device when the request is sent. Such location information can be used to apply any location-specific filters (e.g., at work).

Pursuant to step 312, at least a portion of request 314 is routed by network 212 to multimedia-services framework 242 (e.g., IMS Core). Framework 242 determines 316 custom call routing details, such as by querying subscriber-profiles datastore 244 (e.g., HSS). Upon verifying that mobile device 214 is subscribed to content-filtering services, framework 242 inserts 318 a media proxy 250 into the content path. At step 320 request 322 is forwarded to content provider 222. Although not depicted, instead of automatically inserting media proxy 250, framework 242 could request that mobile device 214 submit another communication, which would indicate whether content should be filtered. If the other communication indicates that filtering is desired, media proxy 250 could then be inserted; however, if the other communication indicates that filtering is not desired, the request for content could be processed without any filtering.

Content provider 222 receives request 322 and, at step 324, provides the requested content 326 (e.g., streaming media, podcast, web content, voicemail message, and live-call content). Content 326 is routed through media proxy 250. At step 328, media proxy 250 communicates routed content 330 to content filter 252.

Content filter 252 receives routed content 330 and checks 332 user settings. For example, content filter 252 might reference user-account datastore 258 to determine a settings identifier. With the settings identifier, content filter 252 can reference prohibited-element datastore 260 to determine any elements that are proscribed from being presented on mobile device 214. Routed content 330 (or text derived from content 330) is then parsed 334 to determine that content 330 includes the prohibited element.

Upon determining that content 330 includes the prohibited element, content 330 is modified 336 and 338. Content 330 might be modified either by content filter 252, media proxy 250, or both. FIG. 3 depicts that content filter 252 modifies 336 the content, which is routed 342 as modified content 340 to media proxy 250. Media proxy 250 might then apply additional edits at step 338. At step 344, media proxy 250 routes content 346 to mobile device 214.

Figure 4:
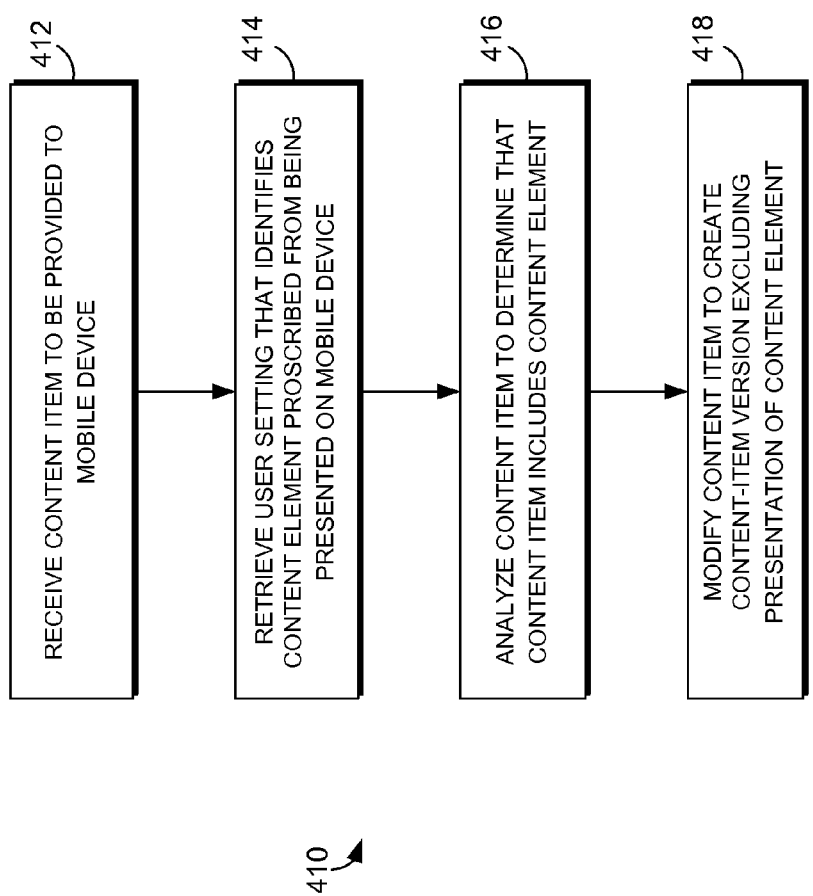

Referring now to FIG. 4, a flow diagram is shown, which depicts a method 410 in accordance with an embodiment of the present invention. When describing FIG. 4, reference might also be made to FIG. 2. In one embodiment, the present invention includes one or more computer-readable media having computer-executable instructions embodied thereon that, when executed, facilitate a method 410 of providing to a mobile device (e.g., 214) a content-item version that is consistent with a user setting (e.g., 236).

At step 412, method 410 includes receiving a content item to be provided to a mobile device (e.g., 214). For example, media proxy 250 might receive from content provider 222 a content item to be provided to mobile device 214. A content item (e.g, web content, streaming media, podcast, and voice-mail message) might be received in response to a request from mobile device 214. Alternatively, a content item (e.g., text message and email message) might be received from content provider 222 without mobile device 214 having submitted any request.

At step 414, method 410 includes retrieving a user setting that identifies a prohibited content element, which is proscribed from being presented on the mobile device. For example, media proxy 250 might route the content item to content filter 252, which references user-account datastore 258. User-account datastore 258 includes setting identifiers (e.g., restrict obscene-language corpus) that are usable to query prohibited-element datastore 260 and determine prohibited content elements (e.g., obscene words).

At step 416, method 410 includes analyzing the content item to determine that the content item includes the prohibited content element. For example, using parser 262, content filter 252 might parse a set of text that is derived from the content item. Moreover, audible speech of the content item might be converted to text, which is parsed by parser 262.

At step 418, method 410 includes modifying the content item to create the content-item version that excludes a presentation of the prohibited content element. For example, content filter 252, media proxy 250, or both, might delete the prohibited element from the content item, insert a blocking censor (e.g., bleep) that masks the presentation, or replace the prohibited term with an acceptable term. The content-item version can then be provided to the mobile device.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. Non-transitory computer-readable media having computer-executable instructions embodied thereon that, when executed, facilitate a method of providing to a mobile device a content-item version that is consistent with a user setting, the method comprising:
   receiving from the mobile device a request to provide a streaming video that is hosted by a content provider;
   routing the request through an IP Multimedia Services (IMS) Core, which queries a Home Subscriber Server (HSS) to determine that the mobile device is subscribed to a content-filtering service;
   inserting, by a component of the IMS Core, a media proxy into a media path by which the streaming video is to be routed to the mobile device;
   transmitting the request to the content provider to provide the streaming video;
   routing the streaming video that is received from the content provider through the media proxy;
   retrieving from the HSS the user setting, which identifies a prohibited term that is proscribed from being presented on the mobile device;
   parsing by a content filter a set of text derived from the streaming video to determine that the set of text includes the prohibited term; and
   modifying the streaming video to create the content-item version that excludes a presentation of the prohibited term and that is provided to the mobile device.

2. The media of claim 1, wherein inserting the media proxy into the media path includes exchanging RTP ports of the media proxy with the mobile device and the content provider.

3. The media of claim 1, wherein the user setting identifies a corpus of words that have been deemed prohibited terms.

4. The media of claim 3, wherein the corpus is customizable, such that a user specifies a term to be included in the corpus.

5. The media of claim 1, wherein the user setting includes a rating of a rating system, and wherein the rating is associated with a corpus of words that have been identified as prohibited terms.

6. The media of claim 1,
   wherein the request includes communication-instance data that identifies a location of the mobile device,
   wherein the user setting is one of a plurality of user settings applicable to the mobile device, and
   wherein the user setting is selected to be retrieved based on the location.

7. The media of claim 1, wherein modifying includes omitting the prohibited term from the content item, inserting an audible censor that masks the presentation, replacing the prohibited term with an acceptable term, or a combination thereof.

8. A method of providing to a mobile device a content-item version that is consistent with a user setting, the method comprising:
   receiving from the mobile device a request to provide a content item hosted by a content provider;
   routing the request through an IP Multimedia Services (IMS) Core, which queries a Home Subscriber Server (HSS) to determine that the mobile device is subscribed to a content-filtering service;
   inserting, by a component of the IMS Core, a media proxy into a media path by which the content item is to be routed to the mobile device;
   transmitting the request to the content provider to provide the content item;
   routing the content item that is received from the content provider through the media proxy;

retrieving from the HSS the user setting, which identifies a prohibited term that is proscribed from being presented on the mobile device;

parsing by a content filter a set of text derived from the content item to determine that the set of text includes the prohibited term; and modifying the content item to create the content-item version that excludes a presentation of the prohibited term and that is provided to the mobile device.

9. The method of claim 8, wherein inserting the media proxy into the media path includes exchanging RTP ports of the media proxy with the mobile device and the content provider.

10. The method of claim 8, wherein the user setting identifies a corpus of words that have been deemed prohibited terms.

11. The method of claim 10, wherein the corpus is customizable, such that a user specifies a term to be included in the corpus.

12. Method of claim 8, wherein the user setting includes a rating of a rating system, and wherein the rating is associated with a corpus of words that have been identified as prohibited terms.

13. The method of claim 8,
wherein the request includes communication-instance data that identifies a location of the mobile device,
wherein the user setting is one of a plurality of user settings applicable to the mobile device, and
wherein the user setting is selected to be retrieved based on the location.

14. The method of claim 8, wherein modifying includes omitting the prohibited term from the content item, inserting an audible censor that masks the presentation, replacing the prohibited term with an acceptable term, or a combination thereof.

15. A system comprising one or more processors coupled with one or more non-transitory computer-readable media, the processors reading computer-readable instructions stored on the media to facilitate operations for providing streaming media content consistent with a user setting comprising:

receiving from the mobile device a request to provide a content item hosted by a content provider;

routing the request through an IP Multimedia Services (IMS) Core, which queries a Home Subscriber Server (HSS) to determine that the mobile device is subscribed to a content-filtering service;

inserting, by a component of the IMS Core, a media proxy into a media path by which the content item is to be routed to the mobile device;

transmitting the request to the content provider to provide the content item;

routing the content item that is received from the content provider through the media proxy;

retrieving from the HSS the user setting, which identifies a prohibited content element that is proscribed from being presented on the mobile device;

analyzing by a content filter the content item to determine that the content item includes the prohibited content element; and modifying the content item to create the content-item version that excludes a presentation of the prohibited content element and that is provided to the mobile device.

16. The system of claim 15, wherein the prohibited content element includes a word, an image, or a combination thereof.

17. The system of claim 15, wherein modifying includes omitting the prohibited content element from the content item, inserting an audible censor that masks the presentation, replacing the prohibited content element with an acceptable term, or a combination thereof.

* * * * *